UNITED STATES PATENT OFFICE.

EMILE PICK, OF PARIS, FRANCE.

PLASTIC COMPOUND FOR THE MANUFACTURE OF STONE, TILE, &c.

SPECIFICATION forming part of Letters Patent No. 281,395, dated July 17, 1883.

Application filed April 2, 1883. (No specimens.) Patented in France March 12, 1883; in Belgium March 14, 1883, and in England March 14, 1883.

*To all whom it may concern:*

Be it known that I, EMILE PICK, a subject of the German Empire, residing at Paris, France, have invented certain Improvements in Plastic Compounds for the Manufacture of Stone, Tiles, &c., of which the following is a specification.

My invention relates to a composition of matter to be employed as a substitute for plaster, lime, and cements in the fabrication of artificial stone, tiles, mortars, cements, &c., and capable of supplanting the same in all their applications.

This novel compound or composition, which I call "neo-plâtre," or "neo-plaster," is composed of gypsum, (hydrated calcium sulphate,) feldspar marl, (marne de feldspath,) and powdered coke, or coke-dust, or any other substance analogous to the latter, which contains a little iron—as powdered slag, for example. These three ingredients may be mixed in various proportions, differing somewhat according to the purpose for which the compound is intended; but the gypsum, which is the base, should, in any case, constitute about seventy-five (75) parts of the entire mass.

I prefer, for ordinary purposes, a compound of about the following proportions—namely: gypsum or calcium sulphate, seventy-five per cent.; marl, fifteen per cent., and coke-dust or pulverized slag, ten per cent.

This compound may be mixed in various proportions with sand, gravel, or broken stone, to form mortars and concretes of superior quality.

The advantages of my compound are principally due to its superior durability, adhesive qualities, lightness, and resistance to fire, water, and frost. It also sets and dries with great rapidity, is easy to handle and manage, is quite inexpensive, comparatively; and the manufacture is simple.

In manufacturing my compound, the first step is to pulverize and mix the materials, and this may be effected by any known means. Stamps or mills may be employed, as best suits the convenience of the operator, experience being the best guide as to choice of means. To facilitate the pulverizing, I find it best to heat the materials before this operation, in order to evaporate the moisture contained in them, and prevent any caking or agglomeration that might occur in reducing the ingredients to powder. The heat necessary for this purpose may be utilized from that radiated from the retort, which is employed in a later step of the preparation, and which will be referred to hereinafter. After the materials have been dried and pulverized they are mixed in the proper proportions, and passed through an inclined sieve or bolt, in order to separate the coarser particles, if any, which must be ground or pulverized anew. This bolting serves also to more intimately mix the ingredients. The mixed powder or dust thus obtained is now submitted to a particular roasting, which should not exceed 350° centigrade or 650° Fahrenheit. The compound being a very poor conductor, I find it best to employ for this roasting a rotary retort, similar to that employed for distilling schists, as this effects a much more uniform and even heating of the compound than any other apparatus that I know of, and this equality in the temperature during the roasting is needed to produce the best results. Other means may be employed; but I find the rotary retort much better than the ordinary mechanical agitator arranged over a furnace, as the latter does not produce results commensurate with the great expenditure of power required to operate it. I do not, however, limit myself to any particular apparatus for roasting or heating the compound. Whatever means may be employed, that which will heat every particle of the compound up to the desired degree, without overheating any portion of it, will produce the best results. The last step is to cool the compound and place it in barrels or bags ready for use or sale, and it should be kept in a dry place. In cooling it, owing to its great avidity for water and its liability to cake, I prefer to pass it again through a rotary sieve or bolt.

My compound may be employed for making durable imitation-marbles by simply adding coloring-matter, in powder, and a suitable body of sand or pulverized pumice-stone, and for making artificial bricks, tiles, &c., by the addition of filamentous substances in proper proportion—such as wood shavings or fibers—the mixture being compressed in molds of the proper form. Such bricks are comparatively light, unalterable, and are capable of resisting a great crushing-force.

I will state that I believe the advantages resulting from the mixture of the ingredients, as herein described, is due to the liberation of silicic acid in the mass.

To apply my compound to any of the uses for which it is adapted, it is only necessary to mix it with water, as in the case of the various limes, plasters, cements, and their compounds.

I am enabled to employ, for admixture with my compound, the plaster-offal which arises from the demolition of houses, the same being ground and heated to free it from the water which enters into the composition. By the use of this material I effect a considerable economy. Coke-dust and slag contain a little iron, and they furnish that ingredient in quantity sufficient for the purpose.

It will be understood that, as before stated, I prefer to employ the hydrated calcium sulphate; but I may employ calcium sulphate as well.

Having thus described my invention, I claim—

The composition of matter herein described, which consists of gypsum, (hydrated calcium suphate,) feldspar marl, (marne de feldspath,) and coke-dust, or other analogous substance containing a little iron, pulverized, mixed, in substantially the proportions specified, and subjected to heat, as and for the purposes set forth.

In witness whereof I have hereunto signed my name in the presence of two subscribing witnesses.

EMILE PICK.

Witnesses:
O. GREEN,
AMAND RITTER.